United States Patent
Tewes et al.

(10) Patent No.: US 7,478,012 B2
(45) Date of Patent: Jan. 13, 2009

(54) COMPUTERIZED EVALUATION OF VALVE SIGNATURE GRAPHS

(75) Inventors: Michael J. Tewes, Marshalltown, IA (US); Mahesh Gade, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 162 days.

(21) Appl. No.: 11/479,501

(22) Filed: Jun. 30, 2006

(65) Prior Publication Data

US 2008/0004836 A1 Jan. 3, 2008

(51) Int. Cl.
*G06F 19/00* (2006.01)
(52) U.S. Cl. ...................................... 702/183
(58) Field of Classification Search ......... 702/182–185, 702/188; 700/38, 44, 282, 108
See application file for complete search history.

(56) References Cited

U.S. PATENT DOCUMENTS

| | | | |
|---|---|---|---|
| 4,980,825 A * | 12/1990 | Tootell et al. ............... | 702/83 |
| 5,594,175 A | 1/1997 | Lyon et al. | |
| 5,687,098 A | 11/1997 | Grumstrup et al. | |
| 2005/0257618 A1 | 11/2005 | Boken | |

FOREIGN PATENT DOCUMENTS

WO  WO-2005/124491 A1   12/2005

OTHER PUBLICATIONS

International Search Report for PCT/US2007/012245, mailed Mar. 4, 2008.
Written Opinion of the International Searching Authority for PCT/US2007/012245, mailed Mar. 4, 2008.

* cited by examiner

*Primary Examiner*—Edward Raymond
(74) *Attorney, Agent, or Firm*—Marshall, Gerstein & Borun LLP

(57) ABSTRACT

The claimed method and system may measure or receive signature data from a process control device, such as a valve, and analyze the data against user configurable boundaries and settings to determine if there is a problem with the operation of the control device. One or more signature graphs that were measured from a prior period may be displayed to a user to assist the user in configuring the characteristic boundaries and settings. The claimed method and system may evaluate a current signature graph against a user configured boundary to determine, among other characteristics, whether a maximum or minimum friction or torque threshold has been crossed, whether the integrity of an actuator or valve shaft has been compromised, and whether valve stick-slip occurrences are within a tolerance level.

30 Claims, 10 Drawing Sheets

COMPUTERIZED EVALUATION OF VALVE SIGNATURE GRAPHS

FIELD OF INVENTION

The present invention relates to process control diagnostics, and more specifically, to computerized diagnostic tests for process control devices.

BACKGROUND

Existing process control systems may perform periodic diagnostics on process control devices or process control components, such as valves, to determine the operability and performance of such devices. Determining the operability of a process control device may permit better scheduling of maintenance of the process control device, thereby decreasing failure occurrences and down time. This may result in increased efficiency, safety, and revenue. The process control systems may use various sensors and other measurement devices to observe characteristics of a process control device. For example, some existing control systems may use a digital valve controller to measure and collect data from various sensors on a control valve.

One diagnostic used for control valves is a valve signature test that measures the position of an actuator or actuator valve opening against an input to the valve, such as an actuator pressure or control signal. A graphical presentation of a signature graph may make it easier for plant operators to notice or detect changes in the characteristics of a valve that may indicate degradation in equipment, and thus, some control systems may implement valve maintenance software, such as AMS™ ValveLink® software from Fisher Controls International LLC of St. Louis, Mo., to display signature graphs. Some valve characteristics that may be determined from a valve signature test may include, but are not limited to, valve friction, actuator torque, dead band and shutoff capability, and actuator spring rate and bench set.

For example, a valve signature test may be run when a control valve is new in order to benchmark the control valve's performance (e.g., valve manufacturer testing). One skilled in the art may understand that the valve signature test may record and/or trend the travel distance or position of the moveable element, such as a valve plug, in the control valve when opening and closing with respect to the applied actuating pressure for initiating such movement. As subsequent valve signature tests are performed on the control valve over time, the results of the signature tests may be reviewed with respect to previous tests to determine various characteristic changes, such as changes in actuator spring rate and valve friction or torque, to determine whether any degradation in performance or control of the control valve has occurred. That is, by overlaying signature graphs users may be able to visually compare current performance with past performance over a particular period of time.

However, because a process control system may involve many control valves or other similar control devices, having an operator individually check signature graphs of each control valve or control device in a plant may consume an unreasonable amount of time, even if the measured signature graph data could be collected at a central point for analysis. Moreover, because signature graphs may be generated while control valves are online, an automated system for determining problems from the signature graphs may assist in curtailing problems that may arise during operation of the valves.

SUMMARY

The claimed method and system may collect or receive process control device signature data obtained from a process control device and analyze the data against user configurable boundaries and settings to determine if there is a problem with the operation of the process control device. In one embodiment, prior signature graphs are displayed to a user to assist the user in configuring the characteristic boundaries and settings. In another embodiment, users may configure the boundaries and settings used for triggering an alert by displaying an original factory run signature graph or by choosing overlays of prior period graphs. The claimed method and system may analyze the signature data across full or partial stroke measurements for the control valve or process control device. In one embodiment, the evaluation may involve signature graph boundaries for maximum friction or torque, minimum friction or torque, disconnected or broken valve shaft, and stick-slip occurrences. In one embodiment, a considerable difference in the performance of the control valve from baseline signature graphs may cause a Pass or Fail indication.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Control devices used in process control systems may include process control devices, such as a control valves, dampers or other alterable opening means, to modulate or control fluid flow within the process control system. It should be understood by one of ordinary skill in the art that although the example embodiments described herein are based upon pneumatic control valves, other process control devices such as pumps, electrically-actuated valves, dampers and the like may also be contemplated without departing from the spirit and scope of the present invention. In general, control devices, such as control valve assemblies, may be positioned in conduits or pipes to control fluid flow by altering the position of a moveable element, such as a valve plug within the control valve, using an attached actuator and positioner. The adjustments to the control element may be used to influence some process condition to maintain a selected flow rate, a pressure, a fluid level or a temperature.

The control valve assembly is typically operated from a regulated source of pneumatic fluid pressure, such as air from a plant compressor. This fluid pressure is introduced into the actuator (such as a spring and diaphragm actuator for sliding stem valves or a piston actuator for rotary valves) through a positioner or valve control instrument which controls the fluid pressure in response to a signal received from the process control system. The magnitude of the fluid pressure in the actuator determines the movement and position of the spring and diaphragm or piston within the actuator, thereby controlling the position of a valve stem coupled to the moveable element of the control valve. For example, in the spring and diaphragm actuator, the diaphragm must work against a bias spring, to position the moveable element (i.e., valve plug) within a valve passageway between the inlet and the outlet of the control valve to modify flow within the process control system. The actuator may be designed so that increasing fluid pressure in the pressure chamber either increases the extent of the moveable element opening or decreases it (e.g., direct acting or reverse acting), the former situation being assumed herein.

Figure 1:
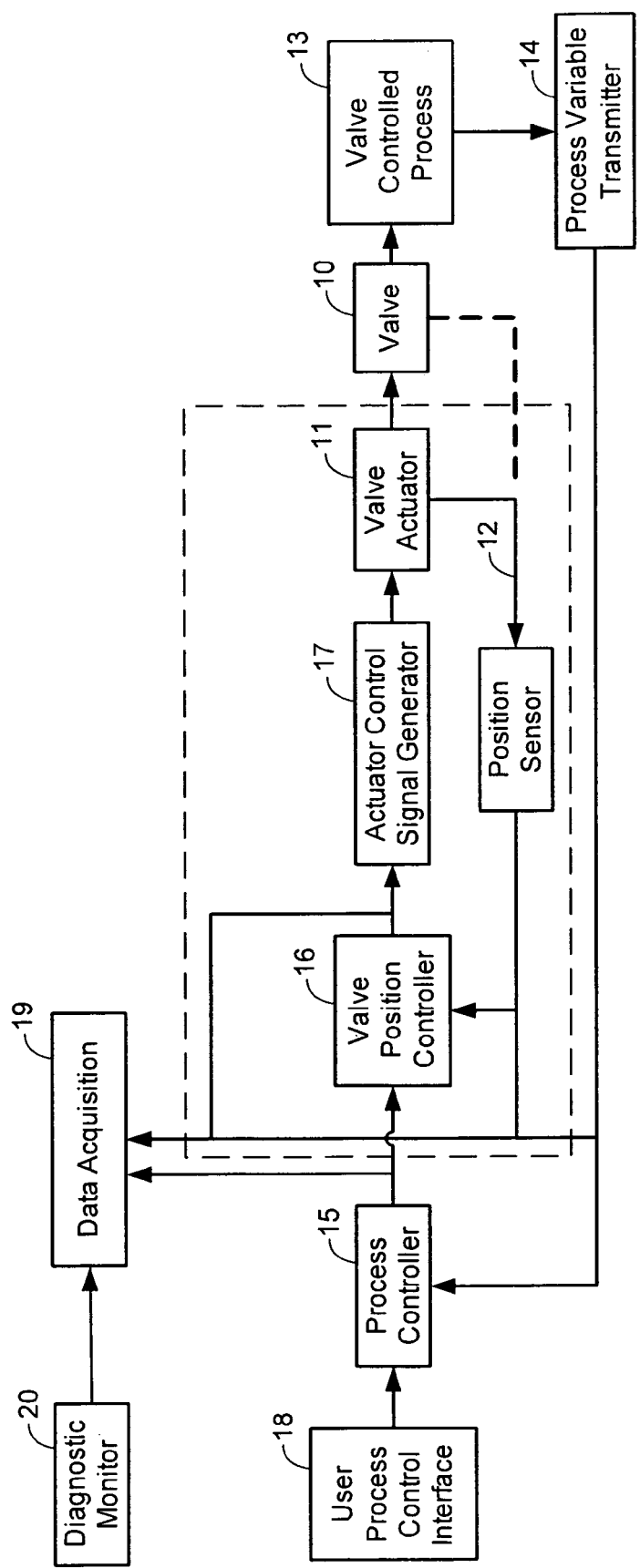
FIG. 1 illustrates an example process control device used in a process control system.

FIG. 1 illustrates a general control valve assembly 9 used in a process control system. A control valve 10 may have a moveable element, such as valve stem and valve plug (not shown), that is selectively positioned by an actuator 11 being controlled by a positioner to modify process flow. It is understood by one of ordinary skill in the art that an indication of the position of the valve plug moveable element is provided through a position sensor 12, which may be integrated into the valve controller 16 or may be a standalone positioner transmitter (not shown). The control valve 10 creates a variable orifice within the flow path of the process control system to control the flow of process materials in the process control system. The process control system may generally use transmitter 14 to detect a process variable to characterize the process. The process variable may be transmitted back to a process controller 15 directing the operation of the process plant to control the process.

The valve controller 16 may also include an actuator control signal generator 17, that may include, for example, an electro-pneumatic stage (not shown) that is controlled by a microcomputer provided therein, that generates an output signal from the valve controller 16 to drive the actuator 11. It should be appreciated by one of ordinary skill in the art that the actuator may be an electric actuator (not shown) and the actuator control signal generator may provide an electric control signal to control or modify the position of the electric actuator. The actuator control signal generator 17 converts the output signal from valve controller 16 to the corresponding control value to be established in the actuator 11. The position sensor 12 may monitor actuator 11 for position input information (via the actuator stem position) or control valve 10 (via the valve stem), shown as a dotted line.

In operation, a user interacts with the control valve 10 and process 13 at a user process control interface 18 that provides commands to a process controller 15 responsible for the control of the entire process 13, where the process controller 15 is in communication with other control devices (not shown) used in the plant for process control. The process controller 15 may translate the input commands supplied by the user at interface 18 into setpoint signal commands. The setpoint signal commands may then be sent to valve controller 16. The valve controller 16 may have therein the microcomputer described above. The microcomputer may be programmed to follow an algorithm for controlling control valve 10 in response to received setpoint signal commands and directing the actuator control signal generator 17 to generate a corresponding control signal in the actuator 11 for positioning the control valve 10.

In the system of FIG. 1, increases in magnitudes of the setpoint commands may cause corresponding increases in the pneumatic pressure provided by actuator control signal generator 17 in the actuator, thereby causing corresponding increases in the opening controlled by the moveable element of the control valve 10. The resulting position of the moveable element may have an effect on process 13 and, accordingly, on the process variable monitored and detected by the process variable transmitter 14. The process variable transmitter 14 transmits a representative signal of the process variable back to process controller 15. One of ordinary skill in the art understands that the process controller 15 uses the representative signal as an indication of the status of process 13 for feedback to control the system.

As discussed above, the process controller 15 may be in communication with other control devices used in the plant for process control. The process controller 15 may also include or may be connected to a computer having general computing elements such as a processor or processing apparatus, a memory, an input device and a display device (e.g., monitor). The processor may be connected to the memory, the display device, and the input device, as known by those skilled in the art. Also, the computer may include a network interface for connecting between a network and the computer to provide communication therebetween. In one embodiment, the computer may form a portion of the process controller, such as in a digital process controller. In another embodiment, the user process control interface may represent the computer. Alternatively, the computer may be connected on a network to the process controller but be physically remote from the process controller.

Further, various sensors, such as position sensor 12, may be positioned throughout the system shown in FIG. 1 to detect and/or measure characteristics of the control device and system and may provide this characteristic information or data to the computer or process controller 15 for display on the display device element, as described further below. In one embodiment, the sensor data may be collected by a data acquisition component 19, which may include the computer processor and memory. In this embodiment, a diagnostic monitor 20 may represent the computer display device that displays the sensor data in a manner described further below. The input device element of the computer may be, for example, a keyboard, a touchpad, mouse, trackball, a lightpen, microphone (e.g., for voice command inputs), etc. Note also that various embodiments of the claimed method and system described below may be implemented as a set of instructions in the processor of the computer for execution, as known by those skilled in the art.

Figure 2A:
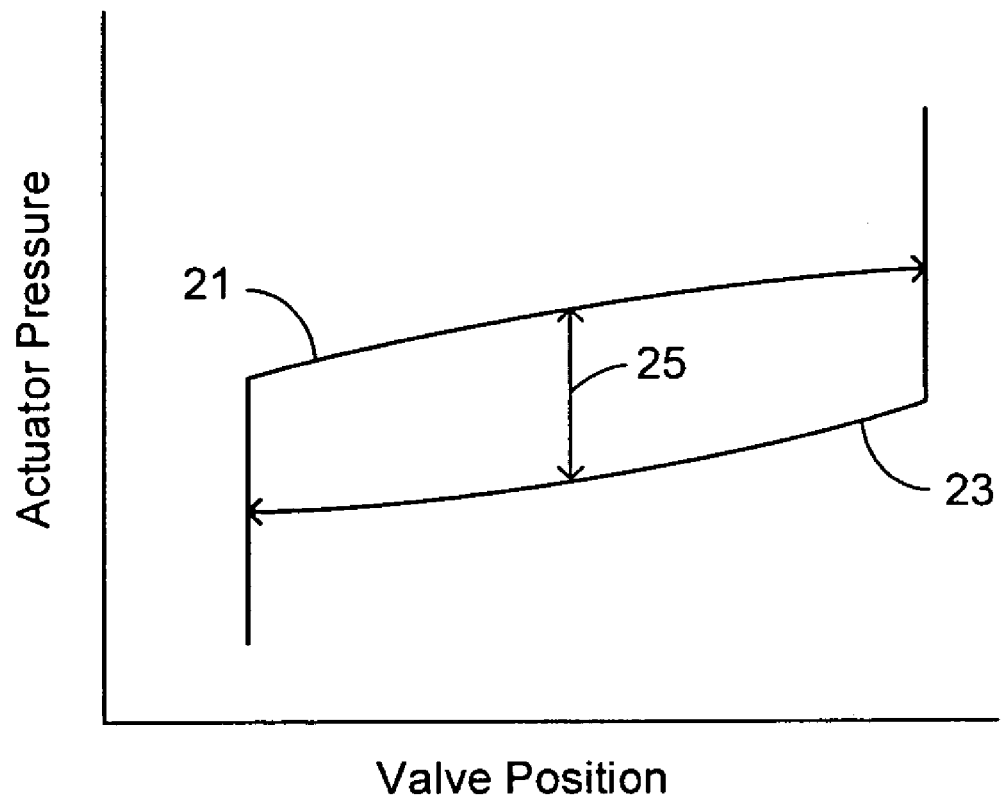
FIG. 2A illustrates a signature graph.

The control valve 10 of the system of FIG. 1, exhibits relationships involving characteristic loops between an output variable, such as a valve position, and an input variable, such as a setpoint or command signal. This relationship may be referred to as a signature graph, an example of which is illustrated in FIG. 2A, where, for example, an actuator pressure from the valve controller is plotted against the position of the moveable element as represented by valve stem or actuator stem position. As illustrated in FIG. 2A, a full range input-output characteristic for fluid pressure in the actuator may be plotted over a corresponding range of the output position of the moveable element of the control valve 10. Alternative input variables, such as setpoint command signals, may also be used in signature graphs.

FIG. 2A illustrates a full-stroke signature graph where a control valve is fully opened from a fully closed position (upstream portion) 21 and where the control valve is fully closed from a fully open position (downstream position) 23. The characteristic graph illustrates that an initial pressure buildup is required to overcome momentum and friction or torque of the actuator 11 and/or control valve 10 before the control valve 10 begins to open and permit flow. This characteristic graph also illustrates that a relatively large pressure drop is required before the positioner is able to begin closing. Moreover, when transitioning from an opening movement to a closing movement, momentum and friction may need to be overcome to force the control valve in the other direction. The pressure required for the transition movement may be illustrated by a vertical path 25 crossing between the upstream and downstream paths. The area between the upstream and downstream path may be referred to as the deadband.

Figure 2B:
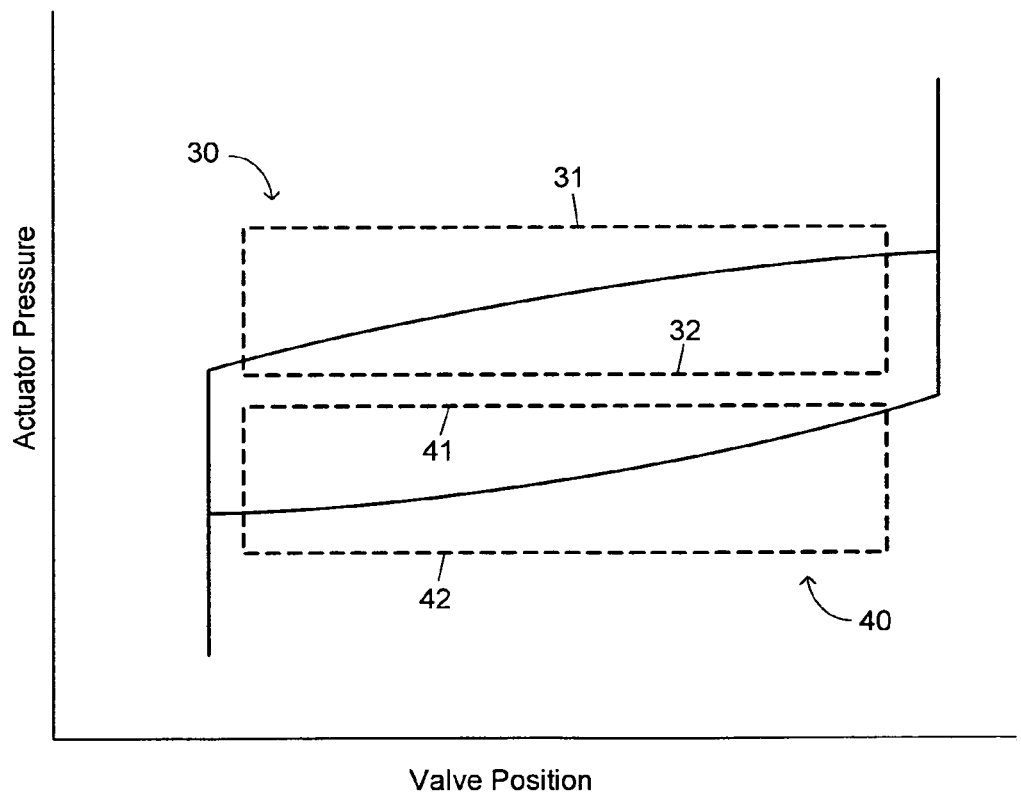
FIG. 2B illustrates a signature graph showing upstream and downstream boundary sets.
Figure 2C:
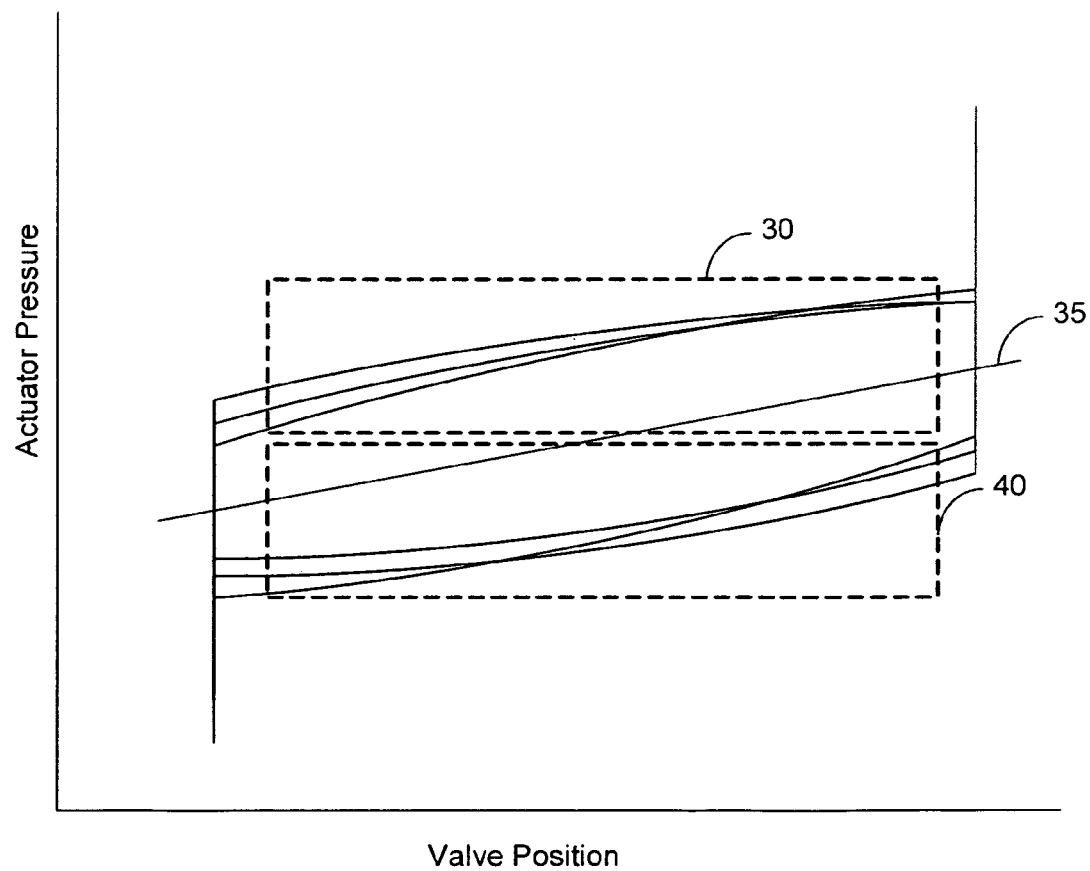
FIG. 2C illustrates configuring upstream and downstream boundary sets over an overlay of multiple signature graphs.

As the control valve or valve performance degrades over time (e.g., moveable element wear, valve packing wear, leaks in the actuator pressure chamber, etc.), the signature graph may change from an initial benchmark measurement graph. This change in the signature graph over time may be indicative of degradation in operation of the valve, due to, for example, friction. The change may prompt repair or replacement of the valve or components of the valve. In order to assist an operator or plant manager in determining maintenance operations, the method and system may allow a user to configure a boundary on a baseline signature graph captured at a prior period in time, as illustrated in FIG. 2B. FIG. 2B illustrates a boundary box 30 and a boundary box 40 for a single baseline signature graph. Alternatively, a plurality of signature graph measurements may be displayed and overlapped for a user to determine a better set of boundaries, as illustrated in FIG. 2C. In this case, a user may use multiple existing signature graphs (including a manufacturer measured graph) to ascertain an average 35 and configure boundaries based on that average. Alternatively, a user may decide which signature graphs are more representative of a condition of the control valve which the user would like to base his/her configurations upon.

FIGS. 2B and 2C illustrate multiple boundaries, one or more of which may be configured at any one time. A first set of boundaries represented as box 30 may be associated with an upstream portion of the signature graph. The topside line 31 of upper box 30 may represent a maximum value of deviation for the upstream portion. This maximum value boundary may represent a maximum friction boundary (in the case of a sliding stem valve) or a maximum torque (in the case of a rotary type valve). The bottom side line 32 of upper box 30 may represent a minimum or lower bound for the control valve representing a minimum friction or torque boundary. The range of control valve position movement determines the width of the boundary boxes and may represent the range in which the claimed system may monitor the graph deviations.

A second set of boundaries represented as lower box 40, may be associated with a downstream portion of the signature graph. In this situation, the top side line 41 of lower box 40 may represent a minimum friction/torque boundary while the bottom side line 42 of lower box 40 may represent a maximum friction/torque boundary. Note that the maximum and minimum boundaries are inverted in the display due to the reverse direction of the control valve position movement. Also, note that the boundaries may be drawn to conform to the slope of the curves and may not be straight rectangular boundaries, as illustrated in FIGS. 6-9, for example.

Figure 3:
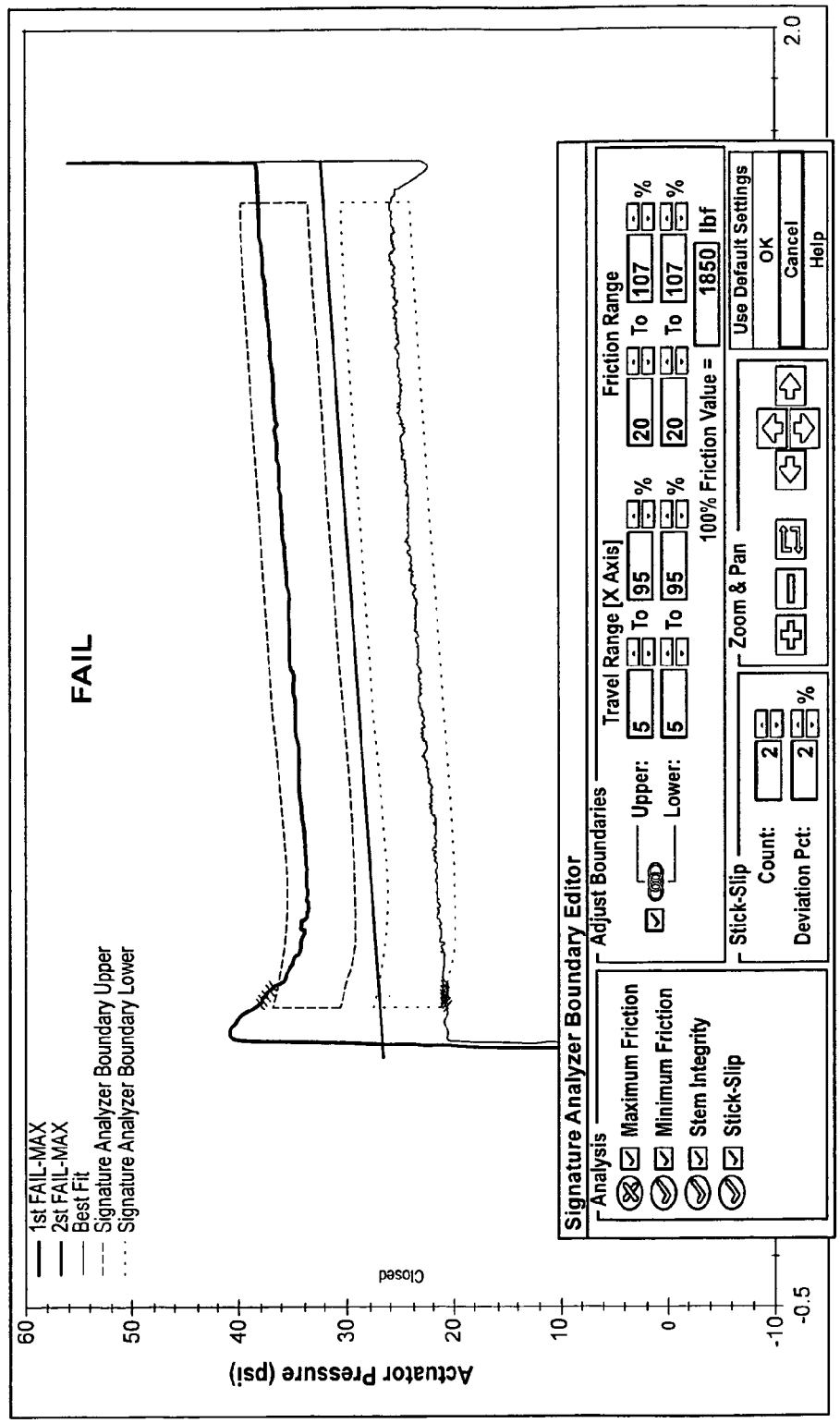
FIG. 3 illustrates a graphical representation of a configuration screen used to manipulate the boundaries for a signature graph.

A baseline signature graph may be obtained from a manufacturer test. Alternatively, the baseline signature graph may be derived from user measurements either before installation or during some initial operation time. This baseline graph may be displayed to a user to assist the user in configuring the boundary. For example, using the displayed baseline signature graph, a user may set or configure one or more boundaries that may serve as deviation thresholds from the baseline against which new signature graph measurements may be compared with. The boundaries may be displayed and updated as the user configures them using the baseline signature graphs, as illustrated in FIG. 3. FIG. 3 further illustrates that the boundaries may be configured or set by entering values into dialogue boxes or menu screens (or other common computer display input controls). In an alternative embodiment, the boundaries may be drawn using a typical computer input device such as a mouse or light pen.

The boundaries that are configured by the user using a baseline signature graph may be used to determine whether an updated, current, or new signature graph conforms to the tolerances represented by the preset boundaries or whether the signature graph indicates a degradation or deviation in one or more characteristics that require some maintenance action, such as repair or replacement of the control valve. For example, after configuring one or more boundaries, as illustrated in FIG. 3, a current signature graph may be measured and analyzed against the configured boundaries to determine whether any graph points violate or exceed the boundaries. In one embodiment, a current signature graph may be displayed and superimposed on the pre-configured boundaries to determine characteristic failures, for example, whether the current signature graph has points outside of a preset boundary.

Figure 4:
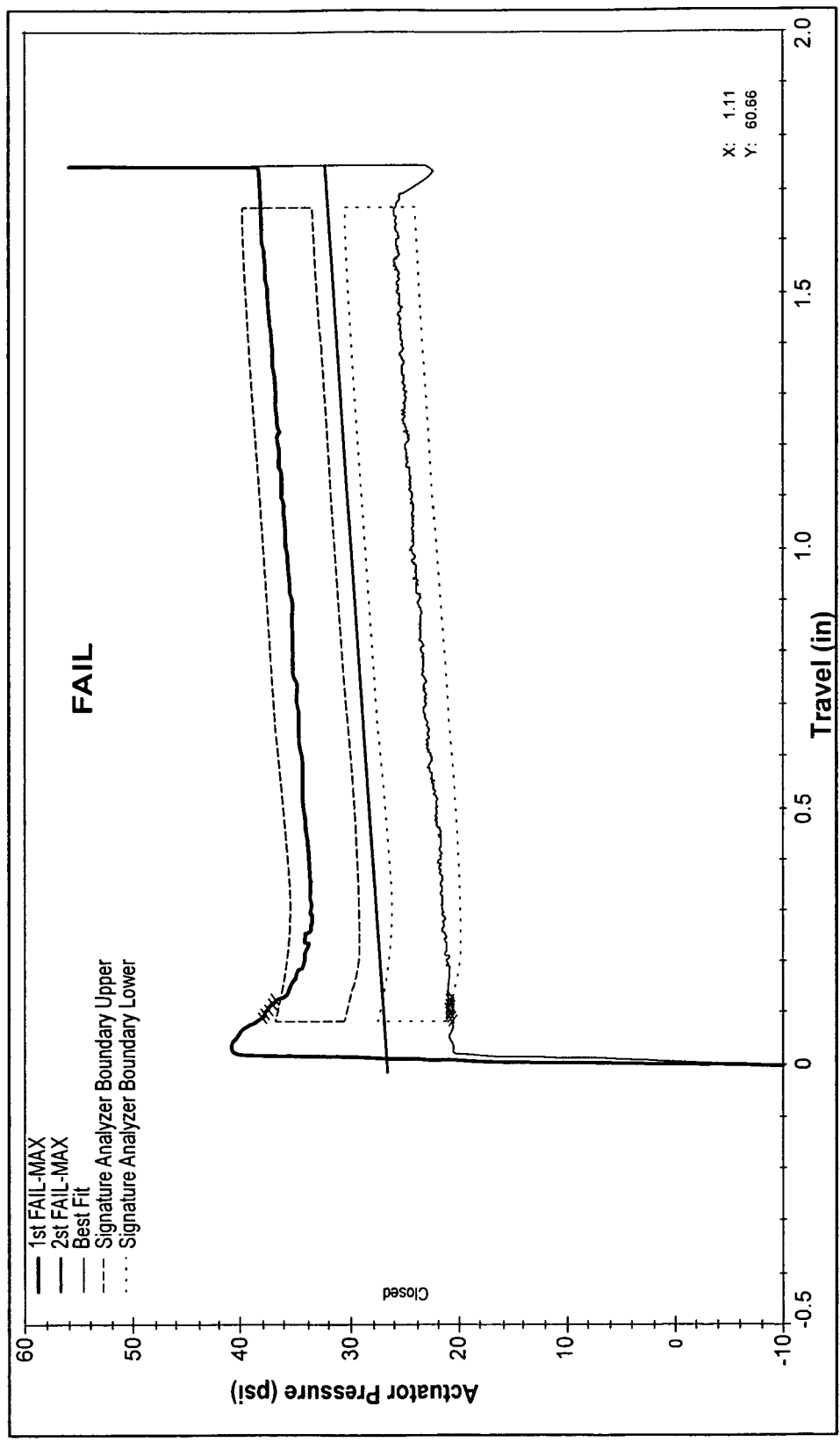
FIG. 4 illustrates a graphical representation of a maximum friction/torque failure including boundary boxes and marked points where failures occur.
Figure 5:
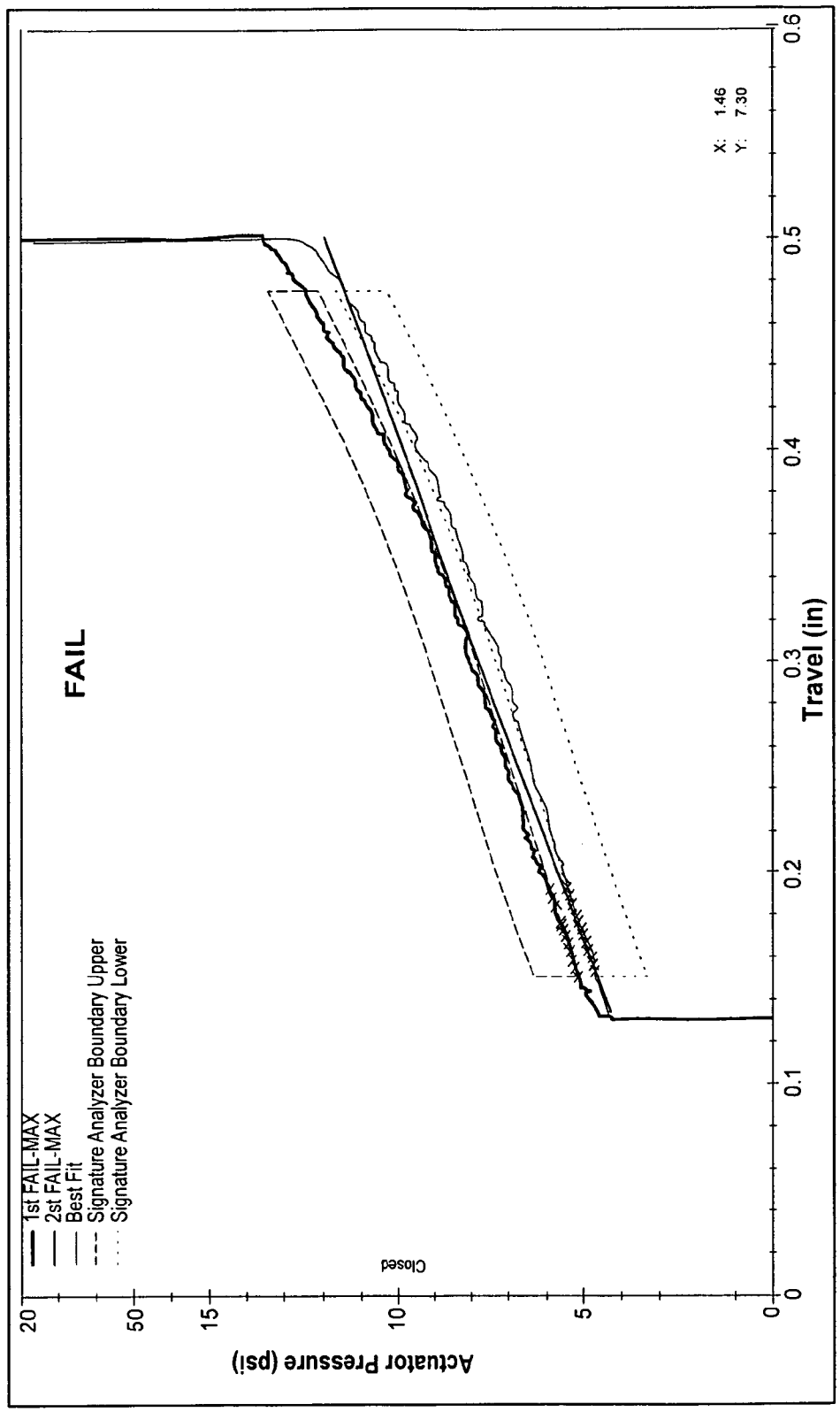
FIG. 5 illustrates a graphical representation of a minimum friction/torque failure including boundary boxes and marked points where failures occur.

FIG. 4 illustrates a graphical representation of a maximum friction or torque failure including boundary boxes and highlighted areas where failures occur on a current signature graph. The embodiment of FIG. 4 highlights the failures using points marked with 'X' on graph. In a similar fashion, FIG. 5 illustrates a graphical representation of a minimum friction or torque failure including boundary boxes and highlighted areas where failures occur on a current signature graph. The embodiment of FIG. 5 also highlights the failures using points marked with 'X' on graph.

Figure 6:
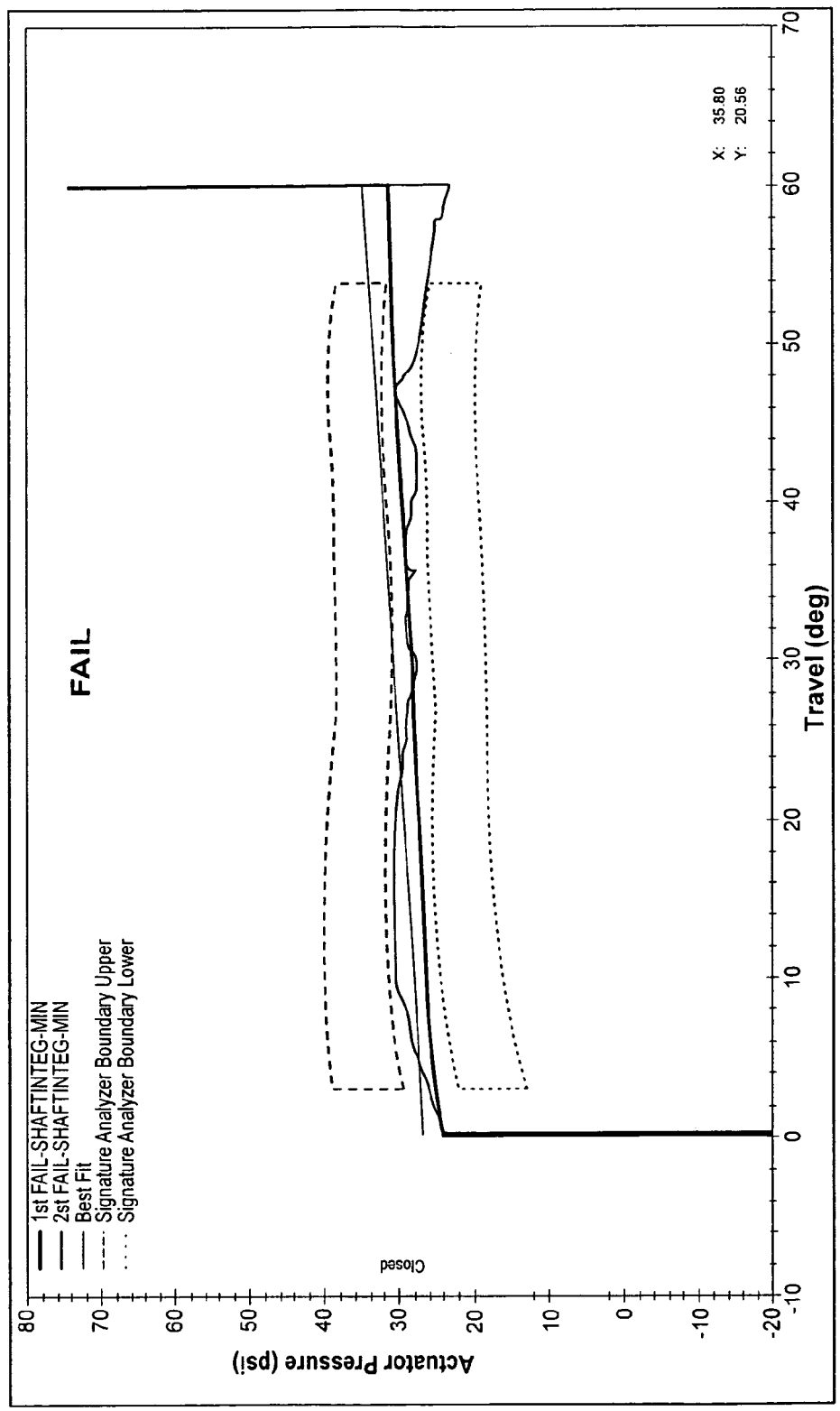
FIG. 6 illustrates a graphical representation of a shaft integrity failure including boundary boxes.

Another characteristic that may be examined using the signature graph is shaft integrity. For example, a damaged or broken valve or actuator stem may be detectable using a signature graph. In this situation, the control valve may be less responsive or unresponsive to changes in actuator pressure in upstream and downstream directions. FIG. 6 illustrates a graphical representation of a shaft integrity failure showing the upstream and downstream boundary boxes. In this situation, note that almost all the data points may fall below the minimum friction/torque level for both upstream and downstream directions, indicating that the shaft or stem may be unresponsive to actuator pressure, and thus, indicating a shaft or stem integrity problem (e.g., a disconnected or broken shaft).

Another operational problem that may be examined using the signature graph is sticking and slipping of the valve or actuator stem. As discussed above, a well known aspect of control valves is that the valve trim (e.g., plug, cage, or stem) and packing is subject to friction, that is, a requirement that a force differential must be applied against the moveable element before the its direction of travel can change (either from an opening movement to a closing movement, or vice versa) from the direction of travel last followed. The friction described previously may be caused by a friction element generally represented by the shape of the dead band. However, in practice, the commands from the process controller directing the positioning of moveable element typically may not smoothly push the moveable element over each position illustrated on the characteristic graph of FIG. 2A. In fact, the movement may be "choppy" (e.g., have a stepped waveform) along the upstream or downstream curve. This characteristic may generally be attributed to some uneven circumstance of friction between the parts of the moveable element and its housing and the actuator which move relative to one another. This aspect may be revealed by a characteristic loop where a portion of the upstream and/or downstream path shows a relatively large change in pressure for a small change in position.

Figure 7:
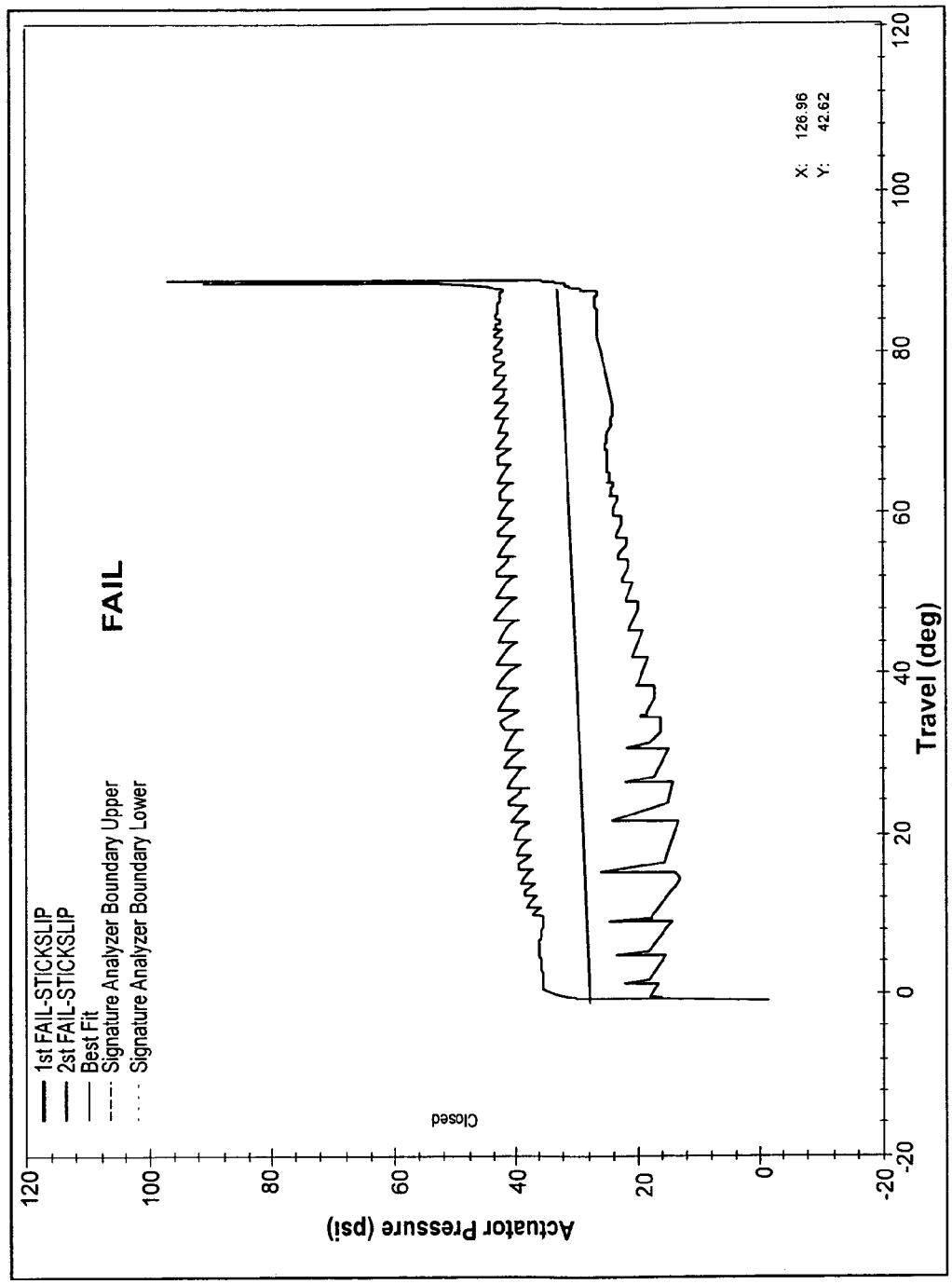
FIG. 7 illustrates a graphical representation of a stick-slip failure including boundary boxes and marked points where failures occur.

FIG. 7 illustrates a graphical representation of a stick-slip failure including boundary boxes and marked points where failures occur (points are marked with 'X' on graph). The claimed method and system may determine the occurrence of a stick-slip condition when the amount of change in actuator pressure over a percent of travel (valve position) is greater than a threshold value. The threshold ratio of percent change in actuator pressure over percent change in travel, or valve position, may be set by a user, as shown in the dialogue box of FIG. 3. In one embodiment, the threshold ratio may be designated by using a deviation percent, representing the standard deviation limit of a current stick-slip ratio from a baseline graph or an actuator travel position deviation from a baseline graph.

In another embodiment, the method or system may take into account a preset stick-slip count or stick-slip count threshold. In this embodiment, the method or system may count the number of consecutive stick-slip occurrences for an upstream or downstream portion of the graph and compare the actual count to a preset stick-slip count threshold. In this embodiment, an indication of a stick-slip failure may be given only when the stick-slip count threshold has been matched or exceeded. Because some stick-slip occurrences may occur without representing a serious operational problem, providing the option of using a preset stick-slip count threshold enables a user to designate an acceptable level of sticking or slipping. FIG. 7 illustrates that upstream and downstream point sets may be checked separately for stick-slip occurrences.

Figure 8:
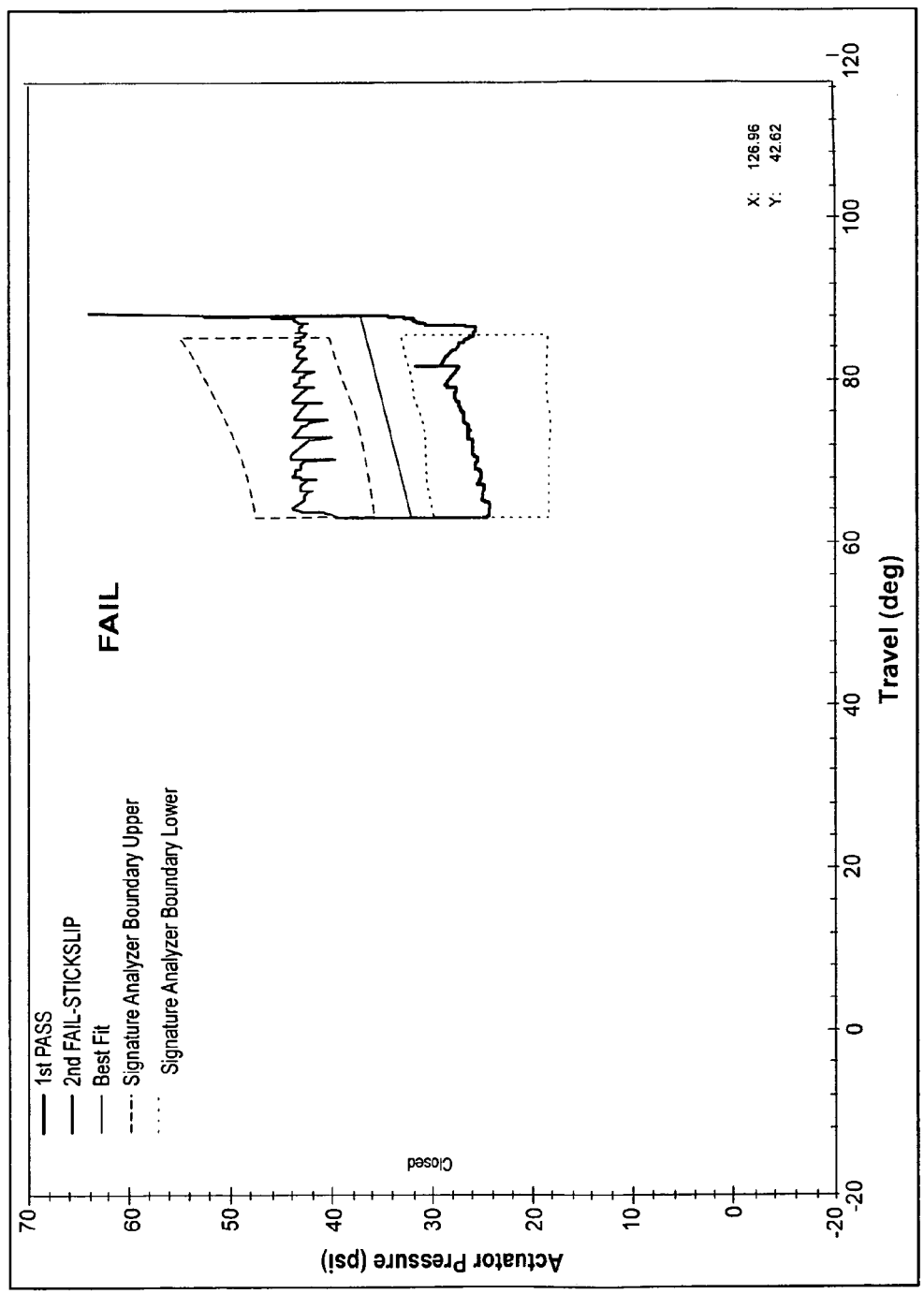
FIG. 8 illustrates a graphical representation of a partial stroke signature graph.

FIGS. 2-7 illustrate full-stroke signature graphs. The general operation of a control valve, however, may not always force a full cycle around the entire characteristic valve signature curve during normal online operation of the control valve in connection with a process control system for controlling at least part of the process. Such full magnitude range traversal, or full stroke graph, over the input-output characteristic of the control valve may, in many processes, only occur during special testing of the control valve (e.g., during manufacturer testing or plant shutdown). Instead, only a partial stroke measurement may be possible. In this case, the method and system may operate on only the partial stroke data, as illustrated in FIG. 8. In this situation, the range of the one or more boundaries may simply be configured or adjusted to match the partial stroke range. Also, the graph may still be based on a full-stroke factory test, however, only a portion of that graph may be used to determine current valve characteristic boundaries. Alternatively, multiple partial stroke graphs may be used to form a baseline graph for purposes of setting boundary conditions for both current partial stroke graphs or current full stroke graphs.

FIG. 3-8 illustrate situations in which a detected violation of a preset signature graph boundary may be indicated using a highlight on a current signature graph, for example, using 'X' marks. In another embodiment, a detected violation may be indicated by raising an alert using a pop-up message box. Alternatively, other alert methods may be used, such as sending an e-mail or an instant message. In another embodiment, where a process controller is coupled to a process control system communication framework, the claimed method and system may provide an indication of a failure by transmitting a standard failure or error message using one of a number of existing communication protocols, such as HART, Fieldbus, etc.

In one embodiment, the method and system may aggregate the results of a plurality of boundary measurements or calculations and provide an overall PASS indication if no failures are detected or a FAIL indication if at least one boundary is violated. Alternatively, the indication of the calculations may be aggregated in a report that is displayed listing each boundary and whether or not the current signature graph data violates any boundary.

Another problem that may be detected using the signature graphs are valve seat positioning problems or other seating issues. Valve seating issues may arise out of friction or worn out seat components. This may be detected using vertical boundaries around the left-most extreme (in relation the existing graphs of FIG. 3-8) where deviations in a straight line closed position may indicate a seat erosion or worn seat problem. Alternatively, in the open right extreme vertical boundaries may be used to determine whether there exist any stop issues. Moreover, the same stick-slip conditions may be analyzed as described above to determine sticking issues at the closed or open valve stem positions. Thus, a box using both vertical and horizontal boxes may be used to represent boundaries for seat/packing issues as well as seat erosion, seat binding, linkage slop, or not fully-closed issues.

The invention claimed is:

1. A method of determining a condition of a process control component using signature graphs comprising:

receiving as an input at a computing device a first signature graph of a process control component wherein the first signature graph is measured at a first period, and wherein the computing device includes a processor, a memory coupled to the processor, and a monitor capable of generating video images;

displaying by the computing device on the monitor the first signature graph;

receiving at the computing device an input defining a first boundary, wherein the first boundary is displayed by the computer on the monitor with the first signature graph;

measuring a second signature graph at a second period different from the first period; and determining by the computer whether the second signature graph is within the first boundary.

2. The method of claim 1, further comprising receiving a plurality of first signature graphs of the process control component corresponding to measurements at periods of time prior to the second period.

3. The method of claim 2, further comprising overlaying for display at least some of the plurality of first signature graphs of the process control component.

4. The method of claim 1, further comprising highlighting an area of the graph in which the second signature exceeds the first boundary.

5. The method of claim 1, wherein the first signature graph is created from one of a factory benchmark measurement provided with the process control component, a full stroke offline user signature measurement, a partial-stroke online user signature measurement, or a plurality of partial-stroke user signature measurements taken over a period of time.

6. The method of claim 1, wherein the first boundary is provided as a default value based on at least one of valve type, actuator type, or actuator size data, and wherein the input defining the first boundary comprises one of a selection of the default value or information for adjusting the first boundary value.

7. The method of claim 1, further comprising indicating whether the second signature graph exceeds the first boundary, wherein indicating comprises one of displaying a screen message, sending an e-mail, sending a text message, sending an instant message, or raising an exception using a process control system communication protocol.

8. The method of claim 1, wherein the first boundary is defined as a percentage of one of friction or torque.

9. The method of claim 1, wherein the first boundary is defined by drawing a boundary on the display containing the first signature graph using an input device.

10. The method of claim 1, wherein the process control component is one of a sliding stem valve or a rotary valve.

11. The method of claim 1, wherein the first boundary is a lower bound for an upstream portion of the signature graph.

12. The method of claim 1, further comprising receiving an input corresponding to a second boundary on the displayed boundary graph and corresponding to an upper bound for an upstream portion of the signature graph, and determining whether the second signature graph is within the second boundary.

13. A method of determining a condition of a process control component using signature graphs comprising:
receiving a first signature graph of a process control component wherein the first signature graph is measured at a first period;
displaying the first signature graph;
receiving an input defining a first boundary, wherein the first boundary is displayed with the first signature graph;
measuring a second signature graph at a second period different from the first period;
determining whether the second signature graph is within the first boundary; and
receiving an input corresponding to a third boundary on the displayed boundary graph and corresponding to a lower bound of a downstream portion of the signature graph, and determining whether the second signature graph is within the third boundary.

14. A method of determining a condition of a process control component using signature graphs comprising:
receiving a first signature graph of a process control component wherein the first signature graph is measured at a first period;
displaying the first signature graph;
receiving an input defining a first boundary, wherein the first boundary is displayed with the first signature graph;
measuring a second signature graph at a second period different from the first period;
determining whether the second signature graph is within the first boundary; and
receiving an input corresponding to a fourth boundary on the displayed boundary graph and corresponding to an upper bound of a downstream portion of the signature graph, and determining whether the second signature graph is within the fourth boundary.

15. A method of determining a condition of a process control component using signature graphs comprising:
receiving a first signature graph of a process control component wherein the first signature graph is measured at a first period;
displaying the first signature graph;
receiving an input defining a first boundary, wherein the first boundary is displayed with the first signature graph;
measuring a second signature graph at a second period different from the first period; and
determining whether the second signature graph is within the first boundary; and
receiving an input corresponding to an actuator travel range and wherein determining whether the second signature graph exceeds the first boundary is performed for the inputted actuator travel range.

16. A method of determining a condition of a process control component using signature graphs comprising:
receiving a first signature graph of a process control component wherein the first signature graph is measured at a first period;
displaying the first signature graph;
receiving an input defining a first boundary, wherein the first boundary is displayed with the first signature graph;
measuring a second signature graph at a second period different from the first period;
determining whether the second signature graph is within the first boundary; and
calculating a set of actuator travel velocities for a set of points of the second signature graph and comparing the set of actuator travel velocities to a threshold velocity.

17. The method of claim 16, wherein the threshold velocity is based on a standard deviation of the actuator velocity over a set of points.

18. The method of claim 16, wherein the set of points are consecutive points.

19. The method of claim 16, wherein the number of points in the set of points is determined based on a preset percent of the data points collected for a given percent of travel of the actuator.

20. The method of claim 18, further comprising determining an actual stick-slip count of the number of times the threshold velocity is exceeded by the calculated set of actuator travel velocities.

21. The method of claim 20, further comprising capturing an input corresponding to a preset stick-slip count and indicating the existence of a stick-slip failure when the actual stick-slip count exceeds the present stick-slip count.

22. A method of determining a condition of a process control component using signature graphs comprising:
receiving a first signature graph of a process control component wherein the first signature graph is measured at a first period;
displaying the first signature graph;
receiving an input defining a first boundary, wherein the first boundary is displayed with the first signature graph;

measuring a second signature graph at a second period different from the first period;

determining whether the second signature graph is within the first boundary; and detecting a compromise in shaft-stem integrity when a predefined number of points of the second signature graph fall below both the upstream lower bound and the downstream lower bound and further indicating the shaft-stem integrity compromise when detected.

23. A method of determining a condition of a process control component using signature graphs comprising:

receiving a first signature graph of a process control component wherein the first signature graph is measured at a first period;

displaying the first signature graph;

receiving an input defining a first boundary, wherein the first boundary is displayed with the first signature graph;

measuring a second signature graph at a second period different from the first period; and determining whether the second signature graph is within the first boundary, wherein the second signature graph represents one of a partial stroke measurement or a full stroke measurement.

24. The method of claim 23, wherein the partial stroke measurement is performed while the process control component is connected to a process control system.

25. The method of claim 23, wherein the full stroke measurement is performed while the process control component is unconnected to a process control system.

26. A process controller for determining a condition of a process control valve using signature graphs comprising:

a display unit that is capable of generating video images;

an input device;

a processing apparatus operatively coupled to said display unit and said input device, said processing apparatus comprising a processor and a memory operatively coupled to said processor;

a network interface connected to a network and to the processing apparatus;

said processing apparatus being programmed to:

receive a first signature graph of a process control component wherein the first signature graph is measured at a first period;

display the first signature graph;

receive an input defining a set of boundaries, wherein the set of boundaries is displayed with the first signature graph;

measure a second signature graph at a second period different from the first period;

determine whether the second signature graph is within the set of boundaries; and indicate one of a friction-torque limit exception, shaft-stem integrity compromise, or a stick-slip failure based on whether the signature graph exceeds one or more of the boundaries.

27. The process controller of claim 26, wherein a friction-torque limit exception occurs when at least one of a minimum or maximum boundary is defined and the second signature graph exceeds the at least one minimum or maximum boundary.

28. The process controller of claim 26, wherein a shaft-stem integrity occurs when a predefined number of points of the second signature graph fall below both an upstream lower boundary and a downstream lower boundary.

29. The process controller of claim 26, wherein a stick-slip failure occurs when a set of actuator travel velocities for a set of points of the second signature graph exceeds a threshold velocity more than a preset number of times.

30. A system for measuring valve signature graphs determining a condition of a process control valve using the valve signature graphs comprising:

a first sensor for sensing an actuator pressure;

a second sensor for sensing a valve position;

a computing apparatus comprising a display unit, an input device, and a processing apparatus operatively coupled to the display unit, the input device, and the first and second sensors, wherein the processing apparatus comprises a processor and a memory operatively coupled to said processor wherein the processor is programmed to collect data from the first sensor and the second sensor over a first testing period;

display a first valve signature graph including data from the first and second sensor over the first testing period;

receive an input defining a first boundary on the displayed first valve signature graph, wherein the first boundary is displayed along with the first signature graph;

store the first valve signature graph and first boundary;

collect data from the first sensor and second sensor over a second testing period to create a second valve signature graph;

determining whether the second valve signature graph is outside the first boundary;

and raising an exception when the second valve signature graph is outside the first boundary.

* * * * *